J. DOWSON.
PINEAPPLE FLESHING MACHINE.
APPLICATION FILED OCT. 29, 1920.

1,370,634.

Patented Mar. 8, 1921.
3 SHEETS—SHEET 3.

Inventor
Joseph Dowson

UNITED STATES PATENT OFFICE.

JOSEPH DOWSON, OF HONOLULU, TERRITORY OF HAWAII, ASSIGNOR TO LIBBY, McNEILL & LIBBY OF HONOLULU, LIMITED, A CORPORATION OF THE TERRITORY OF HAWAII.

PINEAPPLE-FLESHING MACHINE.

1,370,634. Specification of Letters Patent. Patented Mar. 8, 1921.

Application filed October 29, 1920. Serial No. 420,365.

*To all whom it may concern:*

Be it known that I, JOSEPH DOWSON, a citizen of the United States, residing at Honolulu, in the county of Honolulu and Territory of Hawaii, have invented a new and useful Pineapple-Fleshing Machine, of which the following is a specification.

The object of my invention is to provide a machine to operate on the skins or peelings of pineapples after they have been received from the sizer machine, and which will shave off the meat in a solid, clean-cut, block-like condition, instead of the messy and unsatisfactory condition which occurs when fleshing machines heretofore in use are employed. It is a further object of my invention to provide a machine which will be less expensive to construct and less expensive to operate than other fleshing machines used in the Territory of Hawaii. I attain these and other objects of my invention by the mechanism illustrated in the accompanying drawings in which—

Like numerals designate like parts in each of the several views.

Figure 1:
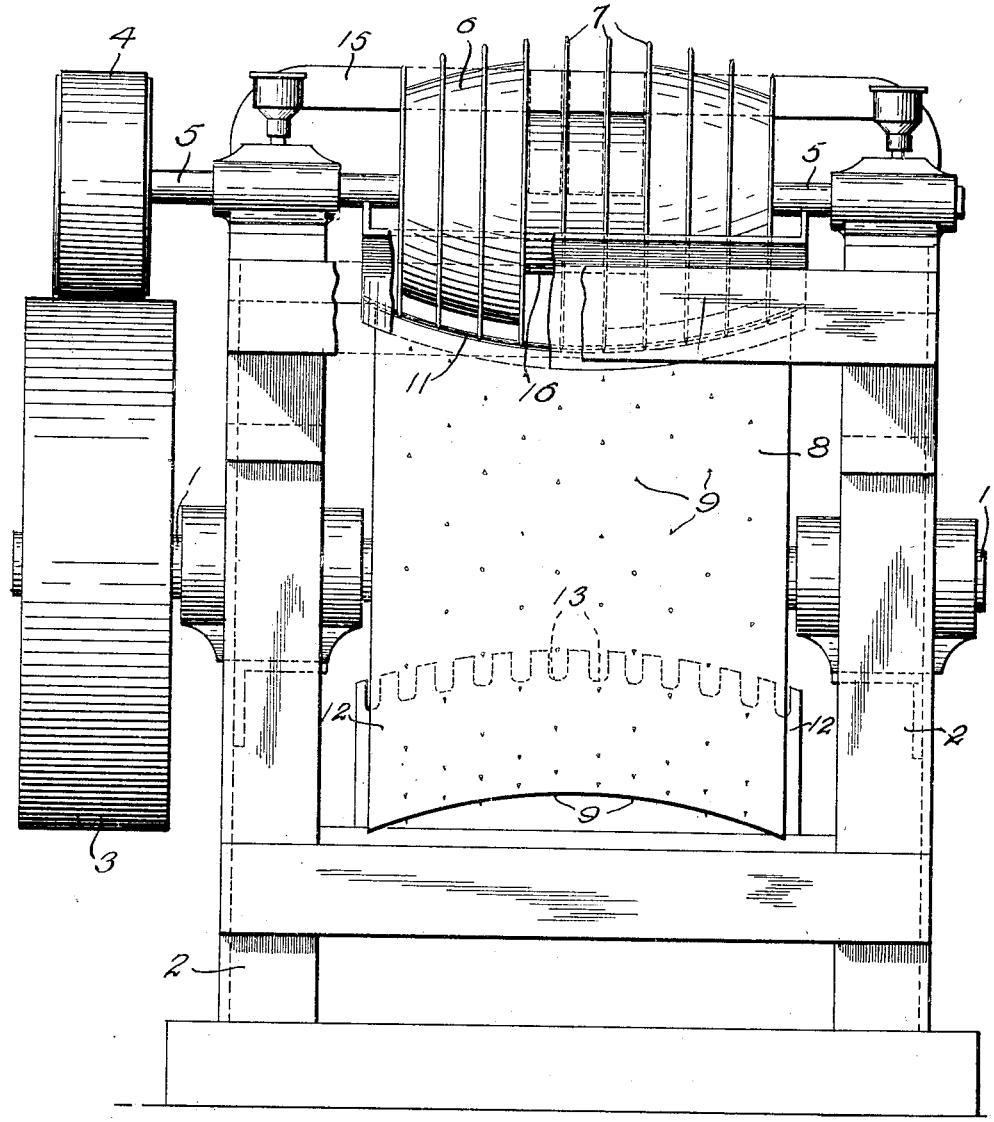
Figure 1 is a front elevation of the machine, with parts broken away.
Figure 2:
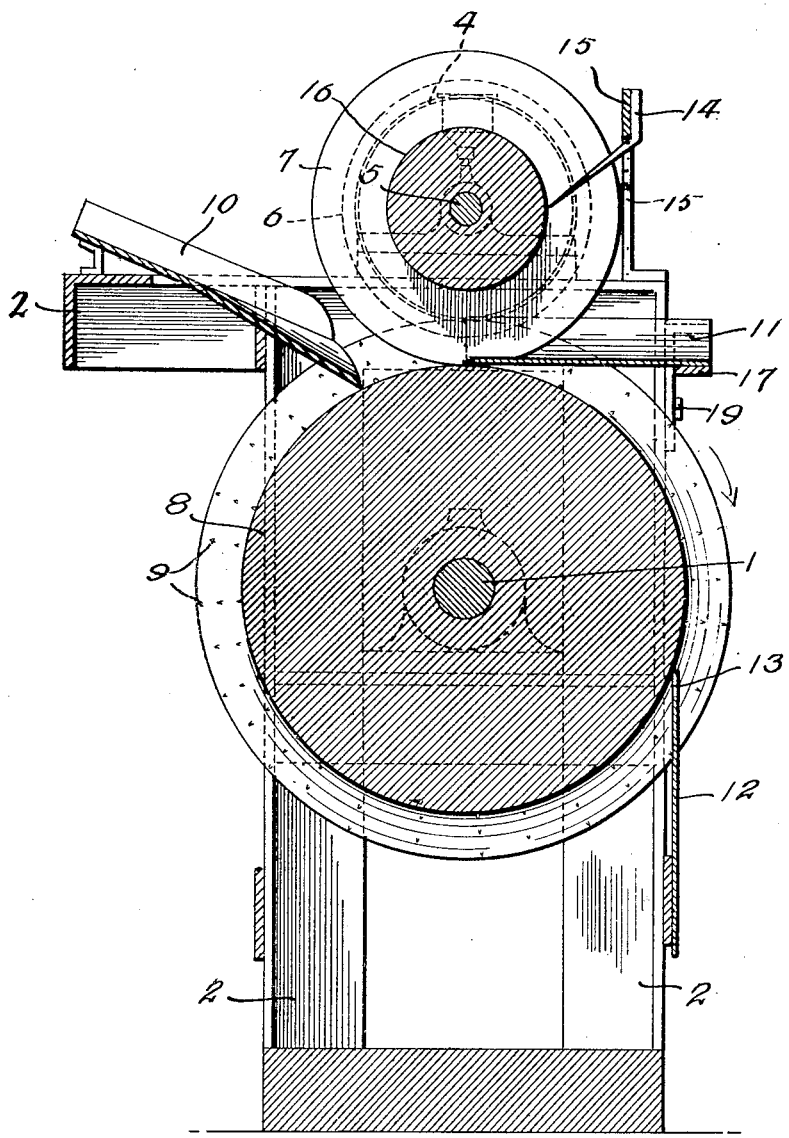
Fig. 2 is a vertical section.
Figure 3:
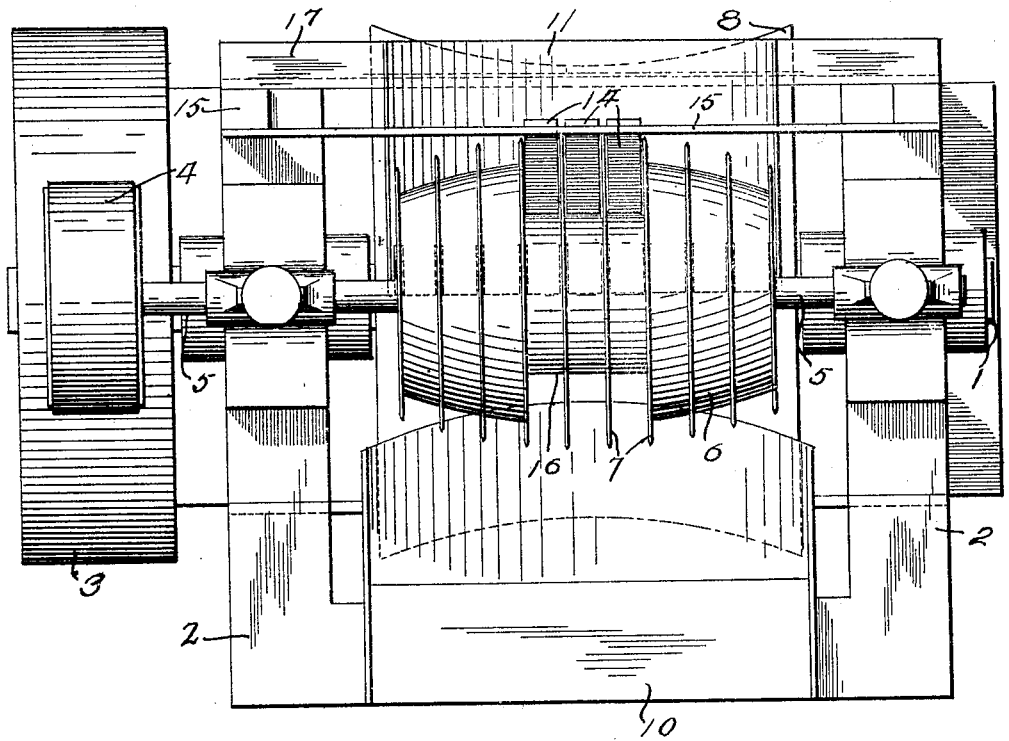
Fig. 3 is a top plan.

Referring to the accompanying drawings I provide a suitable frame 2 in which is mounted a main shaft 1 carrying a belt-driven pulley 3 which contacts with and drives pulley 4 by friction. Pulley 4 is mounted on the upper shaft 5 which carries the barrel-shaped spacing members or disks 6 on which are mounted the spaced circular knives 7, the central knives being of larger diameter than the outer knives, as illustrated in Fig. 1. Positioned below members 6 and 7 I provide a suitable roller 8, preferably of wood, and transversely concave, as shown in Fig. 1, having a multiplicity of metal spikes 9 mounted on its periphery and arranged in rows, as illustrated. I further provide a chute 10 as shown in Fig. 2.

Figure 4:
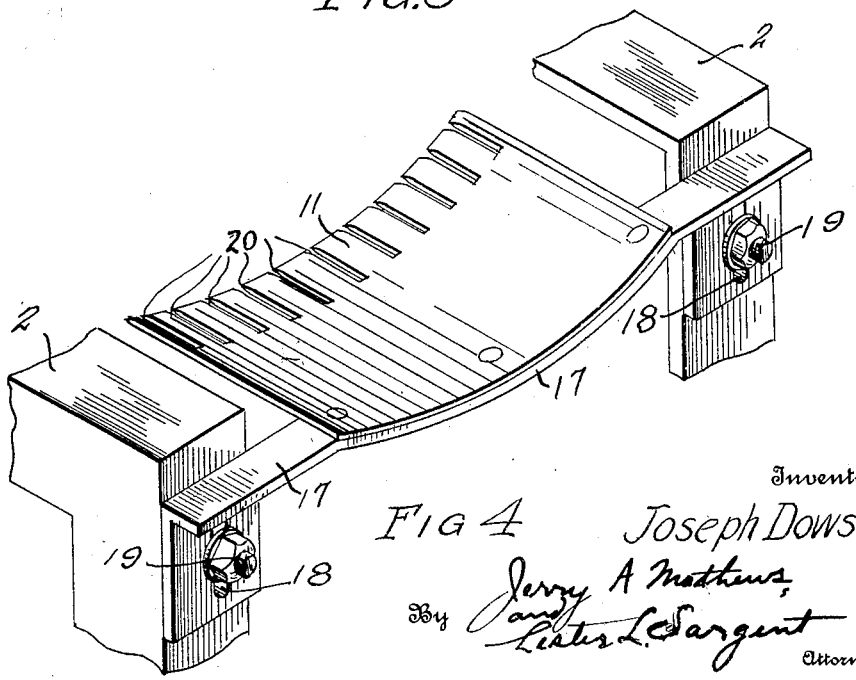
Fig. 4 is a detailed perspective view of member 17.

Oppositely positioned relatively to chute 10 I provide a transversely concave knife 11 corresponding in shape with the shape of the surface of the roller 8 and having spaced slots 20 extending part way in from its cutting edge, as shown in Fig. 4. I further provide a suitable curved scraper 12 having spaced slots 13 alined with the series of spikes 9 on roller 8 to permit of the device scraping the surface of the roller. I provide spacing members or disks 16 of smaller diameter than the disks 6, and having a plurality of scrapers 14 mounted on frame 15 and arranged to scrape the peelings off from spacing disks 16. Knife 11 is attached to a knife support 17, which member is provided with slots 18 to permit of its position being adjusted. Suitable bolts 19 extending through slots 18 engage knife support 17 as illustrated in Fig. 4, and adjustably secure same to frame 2 of the machine, permitting its height to be regulated. Knife 11 is provided with slots 20 to receive the rotating knives 7 and permit of its being positioned as shown in Fig. 2.

In operating the machine, the pineapple skins or peelings as they come from the sizer machine are fed by hand to chute 10. Thence the skins are conveyed between roller 8 and spacing members 6 and 16. By this action the pineapple flesh is severed into strips by the knives 7. The pineapple peelings are carried with the skin side of the peeling downward. Roller 8 revolves clockwise as indicated in Fig. 2, which facilitates the progress of the pineapple peelings. Spacing disks 6 and 16 assist in keeping the pineapple peelings between these members and the roller 8, and scrapers 14 prevent the meat of the pineapple from remaining on the spacing members. The peelings go down with the roller 8 as it rotates toward scraper 12, as shown in Fig. 2, and are thrown away. Curved knife 11 separates the meat of the pineapple from the peeling, which is carried away by a suitable conveyer.

By providing the friction-driven pulley 4 for operating the device I eliminate belt drives and gear systems.

As illustrated in Fig. 4 the curved knife 11 can be adjusted as to its height or contiguity to the roller 8 for regulating the thickness of the peelings 7 from the meat of the pineapple. Scrapers 14 and 12 efficiently scrape the respective surfaces of members 16 and member 8, respectively.

By providing the transversely concave roller 8 and a correspondingly curved knife 11, the apparatus is better adapted for the purpose of shaving the pineapple skins.

The operative parts of the machine are compactly arranged and are of efficient and simple construction, which is an improvement in a machine of this type.

What I claim is—

1. In a pineapple fleshing machine, the combination of a roller having a transversely concave peripheral surface, the surface of the roller carrying a multiplicity of spaced spikes, a series of spaced knives of suitable diameter to have their cutting edges positioned a substantially equal distance from the curved surface of the above described roller, spacing members spacing the knives apart from each other and operatively connected means for driving the roller and the knives in opposite directions.

2. In a pineapple fleshing machine, the combination of a roller having a transversely concave peripheral surface, the surface of the roller carrying a multiplicity of spaced spikes, a series of spaced knives of suitable diameter to have their cutting edges positioned a substantially equal distance from the curved surface of the above described roller, spacing members spacing the knives apart from each other, and a curved pineapple fleshing knife having its cutting edge positioned in proximity to the surface of the roller, said knife having spaced slots to receive the rotating knives.

3. In a pineapple fleshing machine, the combination of a rotatable roller having a transversely concave surface, the surface being provided with means for engaging the skins of pineapples, a series of rotatable knives positioned above the roller and in spaced relation thereto, the knives being of varying diameter and arranged to have their cutting edges spaced a substantially equal distance from the surface of the roller, disks spacing said knives apart, the outer disks being of barrel-shaped form and the central disks being of reduced diameter, scrapers engaging said smaller disks to scrape the pineapple peelings therefrom, and a curved fleshing knife projecting between the rotating knives and the roller beneath, said knife having a series of slots to receive the rotating knives, and means for feeding the pineapple peelings to the concave surface of the spiked roller.

4. In combination with the mechanism described in claim 3, means for adjusting the height of the fleshing knife.

5. In combination with the mechanism described in claim 3, means for adjusting the height of the fleshing knife, and a scraper shaped to engage the surface of the roller, said scraper having spaced slots in its scraping edge, to enable it to clear the rows of spikes on the roller.

6. In a device of the class described, as a new article of manufacture, a pineapple fleshing knife consisting of a transversely concave blade, said blade having a series of spaced slots extending in from its cutting edge, a knife support to which said knife is attached, said knife support having means for its vertical adjustment.

7. In a pineapple fleshing machine the combination of a series of spacing disks, the outer disks being of approximately barrel shape, and the inner disks being of smaller diameter, circular knives mounted between the spacing disks, the central knives being of larger diameter than the outer knives, and scrapers of suitable size to extend between the spaced knives and engage the annular surface of the central spacing disks to scrape off peelings that have adhered to the knives or disks, means for rotatively mounting the circular knives, and spacing disks and stationary means for mounting the coöperating scrapers.

JOSEPH DOWSON.